Feb. 17, 1953    W. C. STEINMETZ    2,628,709
SELF-CLEANING GROOVED RUBBER COVERED PULLEY
Filed Feb. 23, 1949
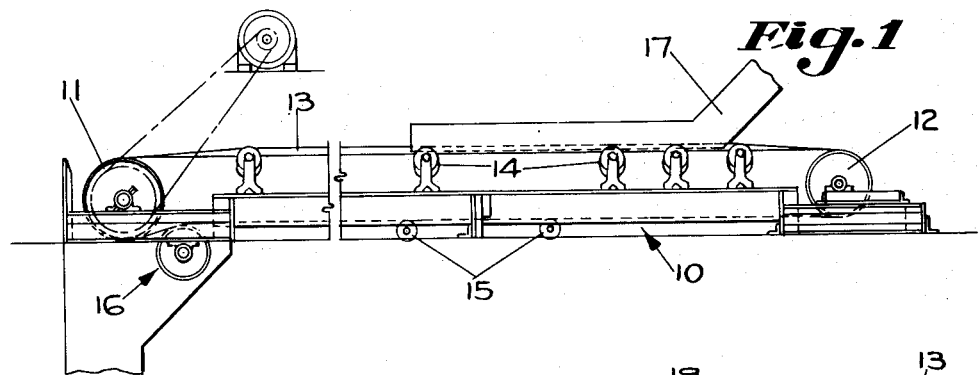
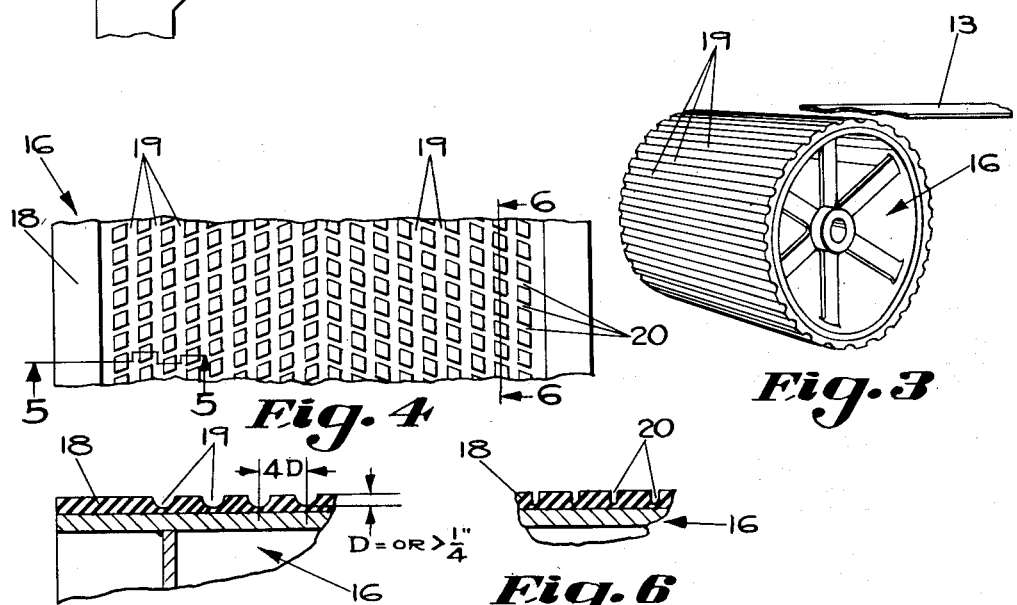
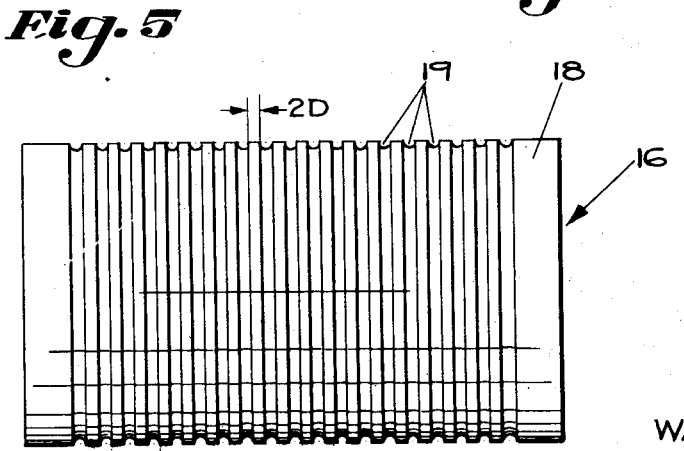
INVENTOR;
WALTER C. STEINMETZ,
BY
ATT'Y.

Patented Feb. 17, 1953

2,628,709

UNITED STATES PATENT OFFICE 2,628,709

SELF-CLEANING GROOVED RUBBER COVERED PULLEY

Walter C. Steinmetz, Columbus, Ohio, assignor to The Jeffrey Manufacturing Company, a corporation of Ohio Application February 23, 1949, Serial No. 77,831

1 Claim. (Cl. 198—230)

This invention relates to a conveyer including a grooved rubber covered snub or bend pulley which acts to clean itself, and an object of the invention is to provide such an apparatus in which the pulley has its peripheral surface contacting the material supporting surface of the conveyer belt along the return run and to clean itself of adhering sticky dirt or frozen moisture, or the like.

Other objects of the invention will appear hereinafter, the novel features and combinations being set forth in the appended claim.

In the accompanying drawings,

Fig. 1 is a somewhat diagrammatic side elevational view of a conveyer incorporating the features of my invention;

Fig. 2 is a front elevational view of one form of pulley that may be employed in the conveyer shown in Fig. 1;

Fig. 3 is a perspective view of a modified pulley and a portion of an associated belt that may be employed in the conveyer shown in Fig. 1;

Fig 4 is a developed view of a section of the preferred form of pulley that may be employed in the conveyer shown in Fig. 1;

Fig. 5 is a sectional view taken along the line 5—5 of Fig. 4, looking in the direction of the arrows; and Fig. 6 is a sectional view taken on the line 6—6 of Fig. 4, looking in the direction of the arrows.

In Fig. 1 of the drawings there is seen a belt conveyer which may be employed to carry dirt, spoilage, or the like, including a frame 10 provided with a motor driven head pulley 11 and adjustable tail pulley 12. An endless conveyer belt 13 extends between the pulleys 11 and 12, the upper run of which is supported on a plurality of troughing idlers 14 carried by the frame 10, the lower or return run being carried on return idlers 15 also carried by said frame 10. Adjacent the head pulley 11, but slightly to the rear thereof and below it, there is a snub pulley 16. A feeding chute 17 is also shown provided on the conveyer frame 10. There is a tendency for conventional flat surfaced or slightly ribbed snub or bend pulleys to accumulate sticky dirt, frozen moisture, or the like.

By this invention there is provided an endless belt conveyer including a snub pulley that contacts directly the dirty working surface of the endless conveyer belt wherein the belt contacting surface of the snub pulley 16 is constructed to prevent the accumulation of sticky material and frozen moisture, and the like, and to remove it effectively from said belt 13 and said pulley. To this end, in one form of the snub pulley, is illustrated in Fig. 2 of the drawings, the cylindrical metal drum thereof is provided with a true cylindrical surface of relatively soft molded rubber 18. The rubber surface 18 is then provided with a plurality of peripheral spaced grooves 19.

Fig. 5 of the drawings is actually a sectional view of the drum of Fig 4, but it also accurately represents a section through the drum 16 and may be so considered.

Tests have indicated that the width, depth and spacing of the grooves 19 is a matter of importance in connection with a snub or bend pulley which may be employed to effect the cleaning operation. In one form of the grooved molded rubber the grooves 19 are formed so that in cross section they define a semi-circle and, as illustrated in Fig. 5, their depth (D) or radius is equal to or preferably slightly greater than one quarter of an inch. This would mean that the width of each groove at the periphery of the pulley, or, in other words, adjacent the belt contacting surfaces or lands thereof, is approximately one half inch. Likewise, the distance between the centers of adjacent grooves is preferably approximately four times their depth, which means that with the parallel rib formation, as illustrated in Fig. 2, the axial dimension or width of each land between any two grooves is 2D, or twice the depth of the groove.

It has been found in practice that the squeezing action on the dirt between the lands and the contacting belt surface extrudes said dirt which is free to flow into the grooves from which it readily drops or is thrown by centrifugal force.

In Fig. 3 of the drawings a modified form of ribbing for the soft rubber covering of the pulley 16 is shown, in which case the grooves are made axial rather than peripheral. The widths of the grooves at the pulley periphery, their depths and their spacing and as a consequence the width of each land between adjacent grooves 19 on the pulley of Fig. 3 is the same as that above described in connection with Figs. 2 and 5.

In Fig. 4 of the drawings a pulley is shown, with the molded rubber peripheral cover 18 in which, in addition to the peripheral grooves 19, there are chevroned or angularly extending transverse grooves 20 which make acute angles with the grooves 19. These angular grooves 20 preferably have approximately the same depth as the grooves 19, but need not be quite so wide adjacent the upper surface of the molded rubber 18. If desired, however, the depths and widths of the grooves 20 may correspond with the grooves 19.

It is evident that with the combined angularly related grooves 19 and 20 illustrated in Fig 4 there is a series of generally diamond or parallelogram shaped areas of the rubber covering 18 which contact the lower working surface of the belt 13 during its return travel.

It is, of course, to be understood that the dimensions given above may be varied so long as the desired result is accomplished. It has been found in practice that very light grooves are in general ineffective because they become filled with dirt and are not self cleaning. On the other hand, grooves with too great a depth are generally not desirable because if they are placed close together the lands between them are undesirably unstable.

It has been found that relatively deep grooves are desirable and that they are preferably relatively close together, affording, however, adequate cross sectional area for the lands or projections between the grooves so that they will not deflect unreasonably under the belt tension, while at the same time providing for a reasonable amount of deflection, to the end that they will cooperate with the contacting surface of the belt to effect an extruding action on the dirt or frozen moisture. This will provide a self cleaning action by the pulley.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

A belt conveyer particularly adapted to carry dirt, spoilage and the like including a frame, a head pulley adjacent one end of said frame, a tail pulley adjacent the other end of said frame, motor means for driving said head pulley, an endless conveyer belt extending between said head and tail pulleys having an upper working run and a lower return run, a snub pulley adjacent said head pulley and below said lower return run of said endless conveyer belt engaging the dirty working side thereof and snubbing said belt about said head pulley, said snub pulley including a true cylindrical belt contacting surface constructed to prevent the accumulation of sticky and frozen matter on both the dirty working surface of the endless conveyer belt and itself, the surface of said snub pulley being made of relatively soft rubber and including a plurality of spaced peripheral grooves and a plurality of spaced chevron shaped transversely extending grooves intersecting all of said peripheral grooves, all of said grooves being substantially semicircular and having a depth of at least $\frac{1}{4}$ inch and being spaced apart approximately 1 inch from center to center whereby the belt engaging lands between said grooves are stable and compressive action between the snub pulley and the dirty working surface of the conveyer belt extrudes sticky and frozen matter removed from said dirty conveyer belt working surface along said chevron grooves to said peripheral grooves from which said extruded matter falls or is thrown by centrifugal force.

WALTER C. STEINMETZ.

REFERENCES CITED

The following references are of record in the file of this patent:

UNITED STATES PATENTS

| Number | Name | Date |
|---|---|---|
| 1,560,524 | Avery | Nov. 10, 1925 |
| 1,776,419 | Dodge | Sept. 23, 1930 |
| 1,972,820 | Smith | Sept. 4, 1934 |
| 2,161,270 | Anderson | June 6, 1939 |